United States Patent
Ishii et al.

(10) Patent No.: US 7,656,438 B2
(45) Date of Patent: Feb. 2, 2010

(54) TARGET USE VIDEO LIMIT ENFORCEMENT ON WIRELESS COMMUNICATION DEVICE

(75) Inventors: Atsushi Ishii, Vancouver, WA (US); Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 475 days.

(21) Appl. No.: 11/649,648

(22) Filed: Jan. 4, 2007

(65) Prior Publication Data

US 2008/0167070 A1 Jul. 10, 2008

(51) Int. Cl.
*H04N 5/76* (2006.01)
*H04N 5/222* (2006.01)
*H04M 1/00* (2006.01)

(52) U.S. Cl. .............. 348/231.1; 348/231.99; 348/231.5; 348/333.02; 348/333.04; 455/556.1

(58) Field of Classification Search . 348/231.99–231.9, 348/333.01–333.13, 207.99; 455/556.1–556.2
See application file for complete search history.

(56) References Cited

U.S. PATENT DOCUMENTS

| | | | |
|---|---|---|---|
| 5,822,700 A | 10/1998 | Hult et al. | 455/466 |
| 7,099,914 B1 | 8/2006 | Hartmann et al. | 709/203 |
| 2004/0133848 A1 | 7/2004 | Hunt et al. | 715/500 |
| 2005/0021803 A1 | 1/2005 | Wren | 709/231 |
| 2005/0054287 A1 | 3/2005 | Kim | 455/3.05 |
| 2006/0007314 A1* | 1/2006 | Fong | 348/207.99 |
| 2006/0161872 A1 | 7/2006 | Rytivaara et al. | 715/864 |
| 2007/0192403 A1* | 8/2007 | Heine et al. | 709/203 |
| 2008/0167070 A1* | 7/2008 | Ishii et al. | 455/556.1 |

FOREIGN PATENT DOCUMENTS

| | | |
|---|---|---|
| WO | WO01/33781 | 5/2001 |
| WO | WO2005/088992 | 9/2005 |

* cited by examiner

*Primary Examiner*—Sinh Tran
*Assistant Examiner*—Richard M Bemben
(74) *Attorney, Agent, or Firm*—Scot A. Reader

(57) ABSTRACT

Method and system for receiving an advance decision from a wireless communication device user to terminate a video sequence captured by the user at a limit length of a target use for the video sequence and enforcing the advance decision upon reaching the limit length. The method and system relieve the user of the burden to continuously monitor the length of video sequences and terminate video sequences at just the right time.

9 Claims, 7 Drawing Sheets

| TARGET USE | LENGTH LIMIT |
|---|---|
| MMS | 100 |
| LOC | 200 |
| MC | 400 |

300

400

TARGET USE VIDEO LIMIT ENFORCEMENT ON WIRELESS COMMUNICATION DEVICE

BACKGROUND OF THE INVENTION

This invention relates to recording video sequences on mobile electronic devices and, more particularly, a method and system for facilitating a user's ability to conform the length of a video sequence recorded on a wireless communication device to a target use for the video sequence.

Wireless communication devices, such as mobile phones, pocket PCs and personal data assistants, often have a video capture system with capability to record short video sequences. These captured video sequences can be stored, transported and played-back in many different ways. For example, they can be stored on a local memory of the device and played-back on the device. They can be stored on a removable memory card inserted in the device and played-back on the device or transported and played-back on another device that receives the removable memory card. They can be stored on a local memory of the device and transported via a wired connection to another local device for playback. Or they can be stored on a local memory of the device and transported via a wireless connection to a remote device for playback.

Each of these target uses may have a different limit length for video sequences. Limit lengths may be inherent in or imposed upon the recording device, the playback device and the mode through which a video sequence is transported between such devices. For example, a local memory of a device may have a first limit length for a stored video sequence, a removable memory card may have a second limit length for a stored video sequence, and a transportation mode between devices may have a third limit length for a transported video sequence. With regard to the latter type of limit, one popular service for transporting a video sequence over a cellular telephone network is Multimedia Messaging Service (MMS). Operators of cellular networks that support MMS commonly impose a limit, such as 100 kilobytes, on the size of the MMS message that is used to carry a video sequence.

Despite these limit lengths, most conventional wireless communication devices are not known to notify a user of how long a video sequence can be without exceeding a limit length associated with a target use, with the result that captured video sequences often violate limit lengths unbeknownst to the user. Such over-limit video sequences may be cropped such that the end of the video sequence is not viewable upon playback, and in some cases may be unable to be played-back at all. Moreover, cropping may impose extensive processing and memory requirements.

Helvick U.S. application Ser. No. 11/583,230, assigned to the assignee hereof ("Helvick I"), proposes a method and system for informing a user of a wireless communication device about conformance of a video sequence captured by the user with a target use for the video sequence. In Helvick I, a video sequence is rendered on a display while information on conformance of the video sequence with at least one target use for the video sequence is rendered simultaneously on the display. The conformance information may comprise representations of a current length and a limit length of the target use of the video sequence in a progress bar format. A first notification is rendered on the display upon approaching the limit length and a second notification is rendered on the display upon exceeding the limit length.

While the target use length limit notifications provided in Helvick I are useful, the user has the burden to continuously monitor progress and terminate video capture at just the right time. Attentive and cautious users may terminate video capture before the limit length of the target use is reached, resulting in less than full exploitation of limit length allowed by the target use and suboptimal video sequences. Inattentive or insufficiently cautious users may terminate video capture after the limit length of the target use is exceeded, resulting in over-limit video sequences with the attendant problems discussed above.

SUMMARY OF THE INVENTION

The present invention, in a basic feature, receives an advance decision from a wireless communication device user to terminate a video sequence captured by the user at a limit length of a target use for the video sequence and enforces the advance decision upon reaching the limit length. The invention relieves the user of the burden to continuously monitor the length of video sequences and terminate video sequences at just the right time.

In one aspect of the invention, a wireless communication device comprises a video capture system, a user interface and a processor communicatively coupled with the video capture system and the user interface, wherein under control of the processor a video sequence is captured by the video capture system and wherein, in response to an input on the user interface indicative of an advance decision to terminate capture of the video sequence at a limit length of a target use for the video sequence, capture of the video sequence is terminated upon reaching the limit length. In one embodiment, the input comprises depressing a stop at limit length key on the user interface before the limit length is reached. In another embodiment, the input comprises depressing a stop key on the user interface before the limit length is reached and holding the stop key in a depressed position until the limit length is reached. In another embodiment, the input comprises depressing a record key on the user interface and holding the record key in a depressed position for a predetermined time. In another embodiment, the input comprises depressing a stop key on the user interface within a predetermined time window before the limit length is reached. The time window may be rendered on the user interface.

In another aspect of the invention, a method for target use video limit enforcement on a wireless communication device comprises the steps of capturing a video sequence and terminating capture of the video sequence upon reaching a limit length of a target use for the video sequence in response to an input commenced prior to reaching the limit length indicative of an decision to terminate capture of the video sequence at the limit length.

In another aspect of the invention, a method for target use video limit enforcement on a wireless communication device comprises the steps of capturing a video sequence, receiving an input indicative of an advance decision to terminate capture of the video sequence at a limit length of a target use for the video sequence and terminating capture of the video sequence upon reaching the limit length.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
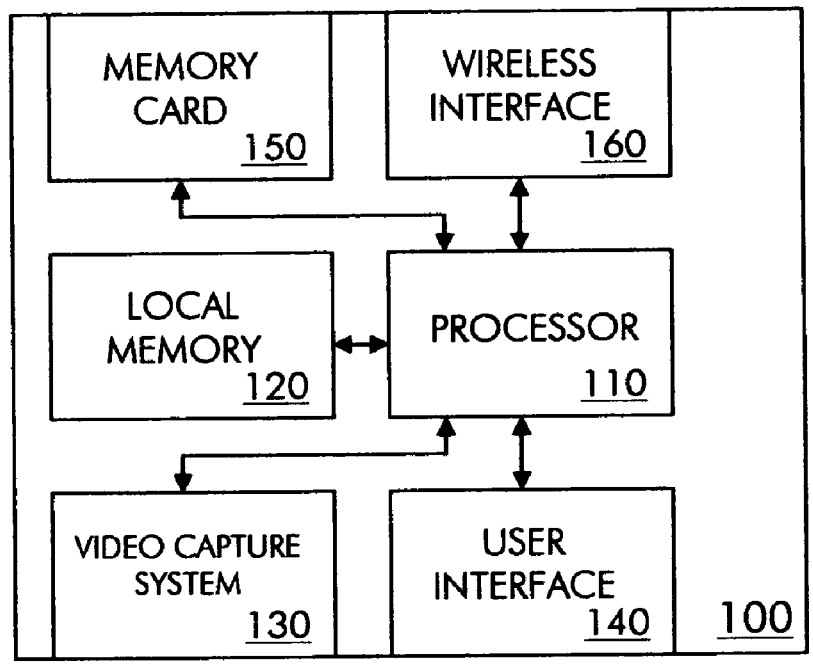
FIG. 1 shows a wireless communication device.

In FIG. 1, a wireless communication device 100 is shown. Device 100 may be, for example, a cellular phone, an Internet Protocol (IP) phone, or a pocket PC or personal data assistant (PDA) with wireless network connectivity. Device 100 includes a processor 110 communicatively coupled between a video capture system 130, a user interface 140, a removable memory card 150 and a wireless interface 160. Processor 110 is adapted to execute device software stored in local memory 120 and interoperate with elements 130, 140, 150 and 160 to perform various features and functions supported by device 100.

Video capture system 130 includes a video camera adapted, under control of processor 110, to capture video sequences. In some embodiments, video capture system 130 further includes a microphone adapted, under control of processor 110, to capture audio sequences that accompany the video sequences. It should be appreciated that video sequences discussed herein may include accompanying audio sequences even where not separately mentioned.

User interface 140 includes a display adapted, under control of processor 110, to render video sequences being captured by video capture system 130 in near real-time. The display is also adapted, under control of processor 110, to render near real-time information on conformance of video sequences with target uses for the video sequences. The display may be a liquid crystal display (LCD), for example. User interface 140 also includes a keypad adapted to receive user inputs. The keypad may be a standard 12-key telephonic keypad supplemented with soft keys, for example.

Memory card 150 is a storage element that is readily attachable and detachable from device 100 and is adapted to store in digital form, under control of processor 110, data received or generated on device 100, such as video sequences captured by video capture system 130. Device 100 has a slot with a communication interface adapted to receive and communicatively couple with memory card 150.

Wireless interface 160 is a network interface adapted to provide wireless connectivity between device 100 and remote devices reachable via network access points with which device 100 has established an over-air link. In some embodiments, wireless interface 160 is a cellular interface that establishes over-air cellular links with cellular base stations. In other embodiments, wireless interface 160 may be an 802.11-compliant LAN interface that establishes over-air LAN links with an 802.11 access points.

In some embodiments, device 100 further includes a wired interface adapted to provide wired connectivity between device 100 and local devices.

Figure 2:
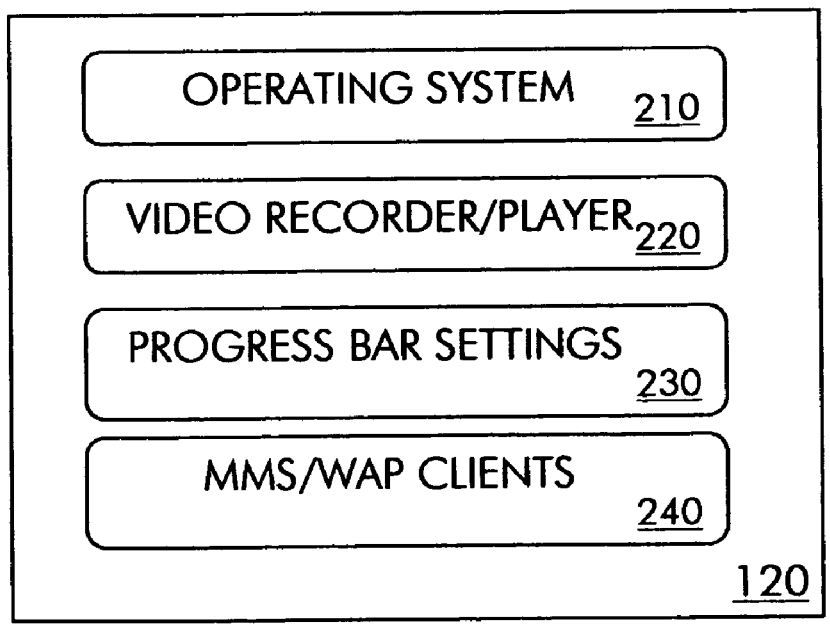
FIG. 2 shows a local memory of a wireless communication device.

Turning to FIG. 2, local memory 120 is shown in more detail to include operating system 210, video recorder/player 220, progress bar settings 230 and Multimedia Messaging Service/Wireless Application Protocol (MMS/WAP) clients 240. In some embodiments, local memory 120 is a flash memory. Operating system 210 has instructions adapted for execution by processor 110 to manage and execute software programs that perform various features and functions supported by device 100. Video recorder/player 220 includes one or more software programs having instructions executable by processor 110 to facilitate capturing of video sequences by video capture system 130 and rendering of video sequences on a display of user interface 140. Video recorder/player 220 also invokes progress bar settings 230 to facilitate rendering of information on conformance of video sequences with target uses for such video sequences. Progress bar settings 230 include settings that specify, for targets uses of video sequences, corresponding limit lengths. In some embodiments, the limit lengths of settings 230 are expressed in maximum time lengths for video sequences, for example, in seconds. In other embodiments, the length limits of settings 230 are expressed in maximum data lengths for video sequences, for example, in kilobytes. MMS/WAP clients 240 include software programs adapted to support the client functions of MMS and WAP for transmitting video sequences to remote devices via wireless interface 160 using MMS as the messaging technology and WAP as the transport technology.

Figures 3, 4:
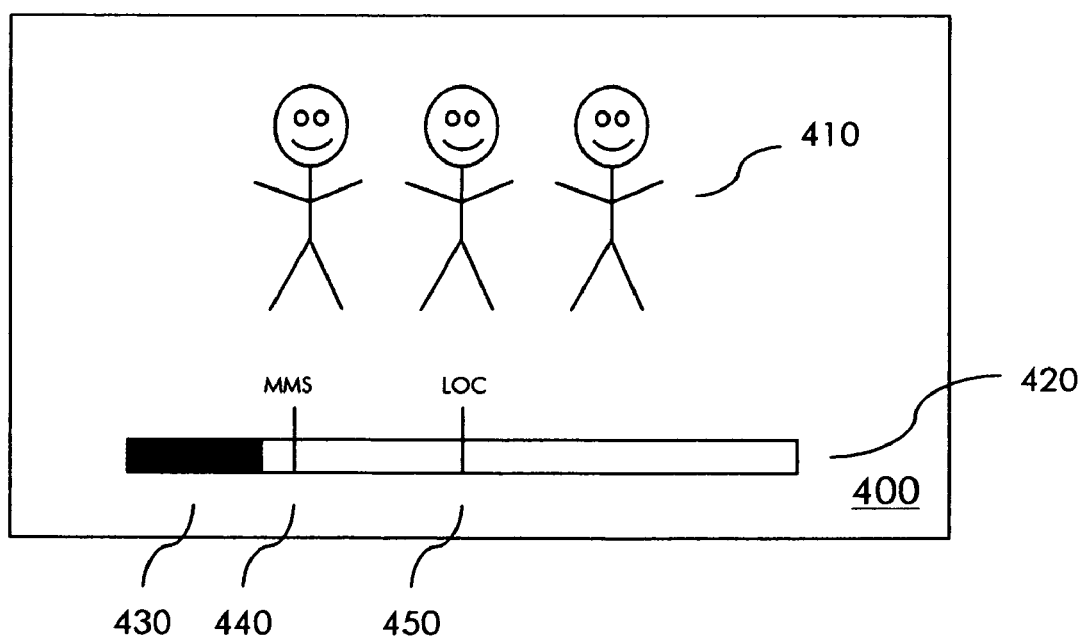
FIG. 3 shows an exemplary table within progress bar settings of a wireless communication device.
FIG. 4 shows a first exemplary screen on a display of a wireless communication device.

Turning now to FIG. 3, an exemplary settings table 300 within progress bar settings 230 is shown. Each entry in table 300 includes an identifier of a target use for a video sequence and a data limit in kilobytes. The first entry is <MMS, 100>. This entry reflects that where the target use is playback on a remote device after offloading a video sequence from device 100 on wireless interface 160 in an MMS message, the video sequence may be up to 100 kB long without violating the limit length of this target use. The limit length of this target use relates to the maximum size of an MMS message. For example, a network operator may impose a maximum size for an MMS message of 100 kB. MMS/WAP clients 240 may enforce the 100 kB length limit by cropping or refusing to offload video sequences that exceed 100 kB. The second entry is <LOC, 200>. This entry reflects that where the target use is playback from local memory 120, the video sequence may be up to 200 kB long without violating the limit length of this target use. The limit length of this target use relates to the amount of memory available within local memory 120 for storing video sequences. For example, the amount of available memory within local memory 120 may be 200 kB. The third entry is <MC, 400>. This entry reflects that where the target use is playback from memory card 150, the video sequence may be up to 400 kB long without violating the length limit of this target use. The length limit of this target use relates to the amount of memory available on memory card 150 for storing video sequences. For example, the amount of available memory on memory card 150 may be 400 kB.

Naturally, the settings described above are merely exemplary; there may be entries for various target uses having various limit lengths. For example, in some embodiments there may be an entry for playback on a local device after offload of the video sequence from device 100 via a wired interface. Moreover, in some embodiments, limit lengths may be expressed as time lengths rather than data lengths. However, it will be appreciated that time lengths will generally not have a fixed correspondence with particular data lengths due to a general dependence of the quantity of data produced on the amount of change in the image being recorded.

Progress bar settings 230 may be originally configured by the manufacturer of device 100 and may be updated by a user of device 100 through inputs made on the keypad of user interface 140, for example. In some embodiments, settings 230 may be automatically updated to reflect changes in limit lengths resulting from transient conditions, such as temporary changes in the amount of memory on local memory 120 or memory card 150 that is currently available for storing video sequences.

Turning now to FIG. 4, a first exemplary screen 410 on a display 400 of user interface 140 is shown. Screen 410 is rendered substantially contemporaneously with the capture of a video sequence by video capture system 130, that is to say, in near real-time. Screen 410 renders the near real-time video sequence while rendering simultaneously near real-time information on conformance of the video sequence with target uses for the video sequence.

In the example shown, conformance information is shown for two target uses. The first target use is remote playback of the video sequence after offload via wireless interface 160 in an MMS message. The second is local playback of the video sequence from local memory 120. The conformance information includes a progress bar 420 having a current length indicator 430 showing the current length of the video sequence relative to MMS limit marker 440 and LOC limit marker 450, which are associated with limit lengths for the remote playback target use and the local playback target use, respectively. Limit markers 440, 450 are rendered at fractional distances along progress bar 420 in accordance with limit lengths retrieved by video recorder/player 220 from progress bar settings 230 that fall within the maximum video sequence capture length supported by device 100. For example, in the example shown, the maximum video sequence capture length supported by device is 400 kB such that progress bar 420 is 400 kB long; the limit length for remote playback of the video sequence after offload in an MMS message is 100 kB such that MMS limit marker 440 is displayed at the one-quarter mark of progress bar 420; and the limit length for local playback of the video sequence from local memory 120 is 200 kB such that LOC limit marker 450 is displayed at the one-half mark of progress bar 420.

In operation, as the user shoots the video sequence, current length indicator 430 traverses progress bar 420 from left to right, approaching and eventually exceeding limit markers 440, 450 en route to the right end of progress bar 420. As limit markers 440, 450 are approached and surpassed by current length indicator 430, advisory screen events are issued to the user. In some embodiments, as each one of limit markers 440, 450 is approached, a text message is rendered on screen 410 warning the user that he or she is about to reach the limit length for the target use associated with the one of the limit markers 440, 450. And as each one of the limit markers 440, 450 is surpassed, a text message is rendered on screen 410 notifying the user that he or she has exceeded the limit length for the target use associated with the one of the limit markers 440, 450. In some embodiments, in addition to or in lieu of text messages, color changes in current length indicator 430 may be used to advise the user of current status of the video sequence relative to limit lengths.

It will be appreciated that the limit markers and the advisory screen events allow the user who is shooting the video sequence to better budget the time afforded by the target use for the video sequence.

A warning screen event may be issued when current length indicator 430 is a number of kilobytes away from each one of limit markers 440, 450. In some embodiments, the number of kilobytes may be configured in progress bar settings 230.

Figure 5:
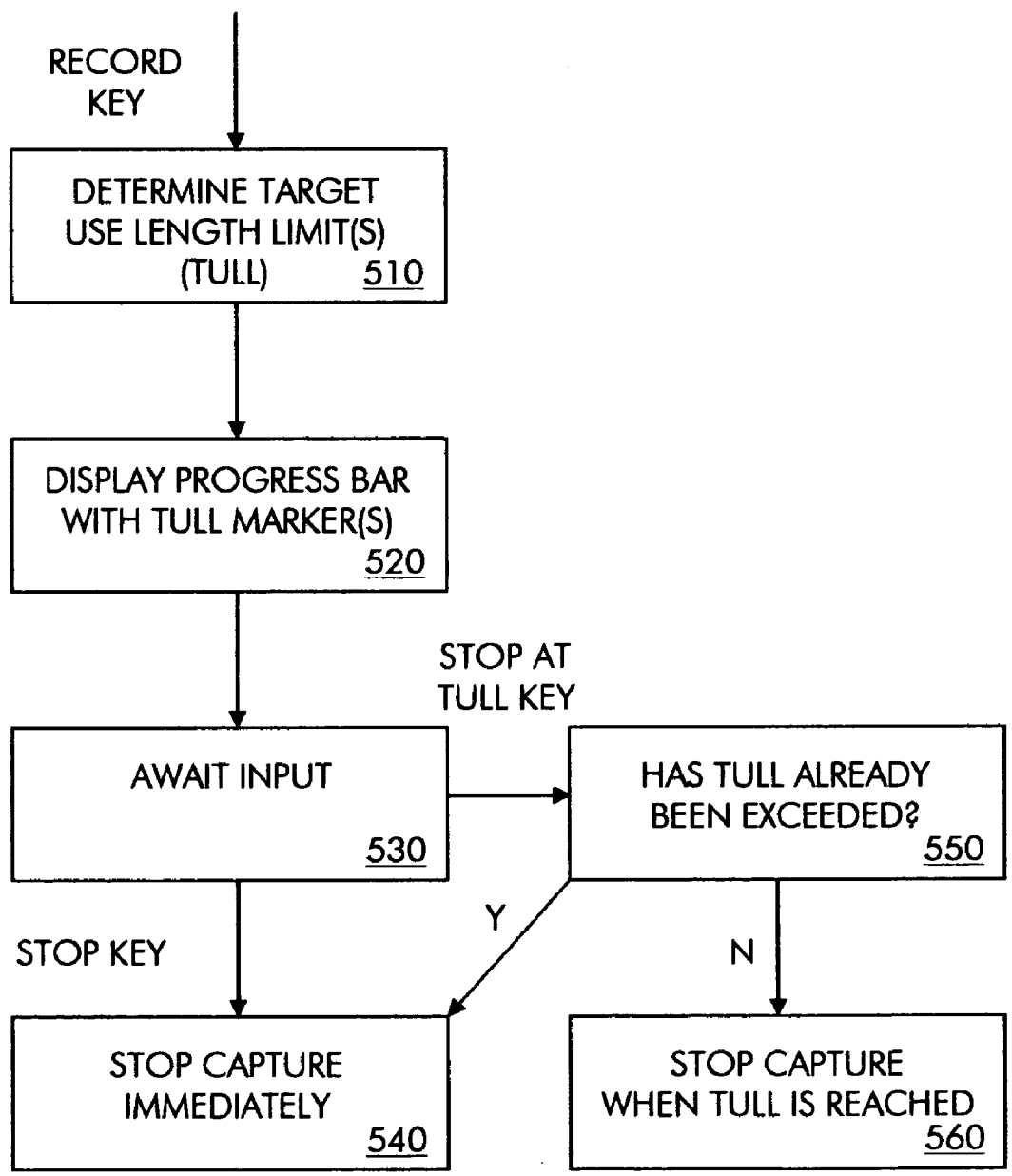
FIG. 5 is a flow diagram of a first target use video limit enforcement method performed by a wireless communication device.

Turning now to FIG. 5, a flow diagram of a first target use video limit enforcement method performed by device 100 is shown. The flow begins with device 100 awaiting the start of capture of a video sequence. The start of capture is initiated by a user who depresses and releases a RECORD key on a keypad of user interface 140. Once the video sequence begins to be captured, device 100 determines operative target use length limits (TULL) for video sequences (510) through consultation of progress bar settings 230. Once the operative TULL have been determined, device 100 renders on display 400 in near real-time the video sequence being captured while rendering simultaneously a near real-time progress bar having a current length and one or more TULL markers determined from the operative TULL (520). The flow continues with device 100 awaiting a user input (530). If the user input is depression and release of a STOP key on the keypad of user interface 140, device 100 stops video capture immediately (540). If the user input is depression and release of a STOP AT TULL X key on the keypad of user interface 140, device 100 determines if the TULL identified by X, for example, the MMS TULL, has already been exceeded (550). If the identified TULL has not already been exceeded, device 100 stops video capture when TULL X is reached (560). If the identified TULL has already been exceeded, device 100 stops video capture immediately (540).

Figure 6:
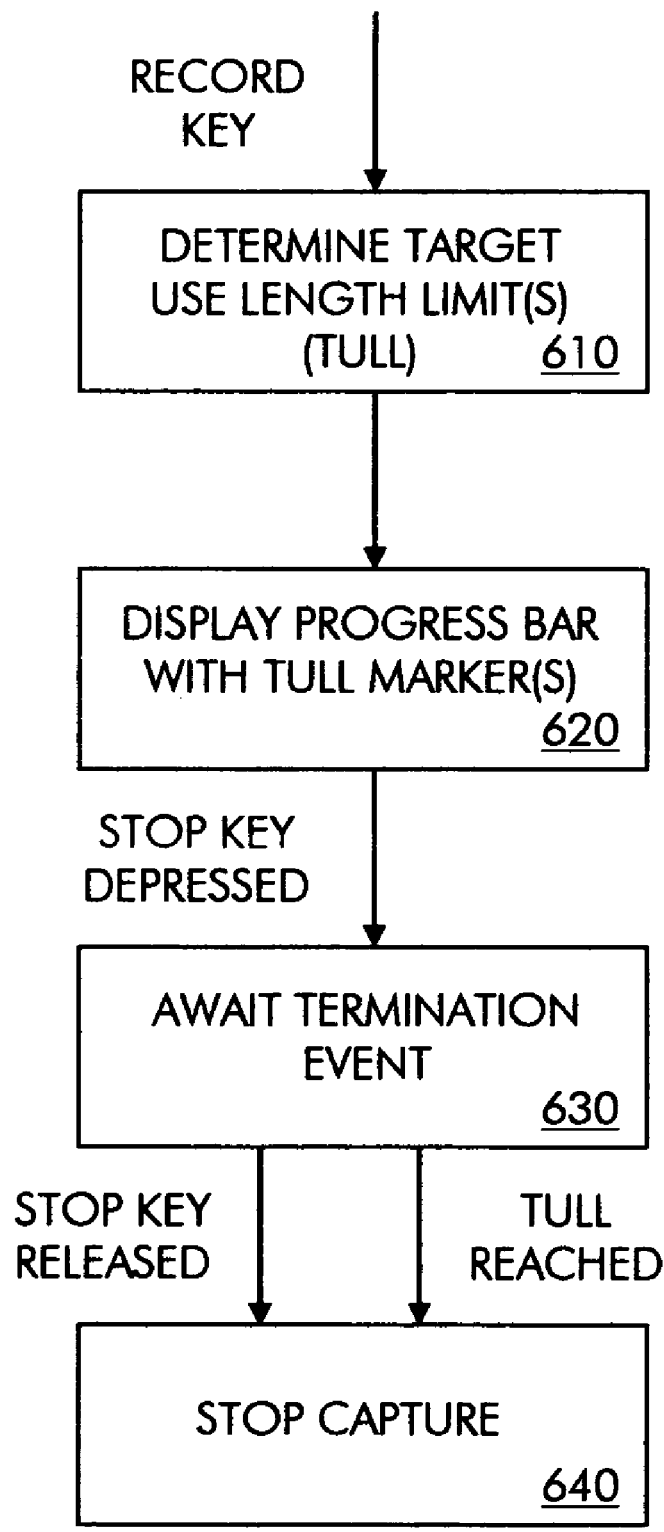
FIG. 6 is a flow diagram of a second target use video limit enforcement method performed by a wireless communication device.

Turning to FIG. 6, a flow diagram of a second target use video limit enforcement method performed by device 100 is shown. The flow begins with device 100 awaiting the start of capture of a video sequence. The start of capture is initiated by a user who depresses and releases a RECORD key. Once the video sequence begins to be captured, device 100 determines operative TULL for video sequences (610) through consultation of progress bar settings 230. Once the operative TULL have been determined, device 100 renders on display 400 in near real-time the video sequence being captured while rendering simultaneously a near real-time progress bar having a current length and one or more TULL markers determined from the operative TULL (620). Device 100 then awaits depression of a STOP key. When the STOP key is depressed, device 100 awaits a termination event, which is either release of the STOP key or reaching of the next TULL (630). Device 100 stops video capture when the STOP key is released or the next TULL is reached, whichever occurs first (640).

Figure 7:
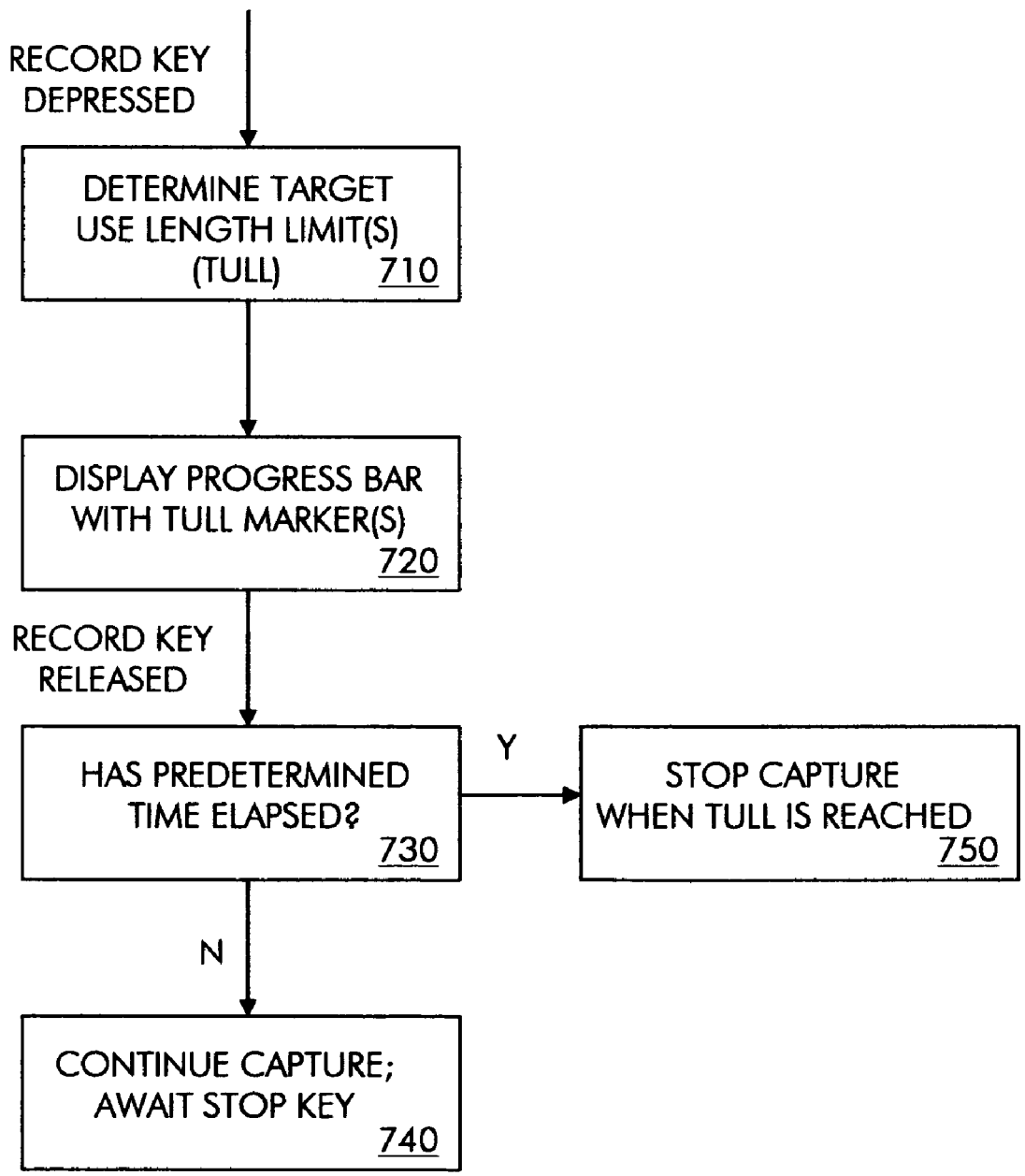
FIG. 7 is a flow diagram of a third target use video limit enforcement method performed by a wireless communication device.

Turning to FIG. 7, a flow diagram of a third target use video limit enforcement method performed by device 100 is shown. The flow begins with device 100 awaiting the start of capture of a video sequence. The start of capture is initiated by a user who depresses a RECORD key. Once the video sequence begins to be captured, device 100 determines operative TULL for video sequences (710) through consultation of progress bar settings 230. Once the operative TULL have been determined, device 100 renders on display 400 in near real-time the video sequence being captured while rendering simultaneously a near real-time progress bar having a current length and one or more TULL markers determined from the operative TULL (720). Device 100 then awaits release of the RECORD key. When the RECORD key is released, device 100 determines if the elapsed time between depression and release of the RECORD key exceeded a predetermined time, for example, three seconds (730). If the elapsed time did not exceed the predetermined time, device 100 continues video capture until a STOP key is depressed and released, for example (740). If the elapsed time exceeded the predetermined time, device 100 stops video capture when a predetermined TULL, for example the MMS TULL, is reached (750).

Figure 8:
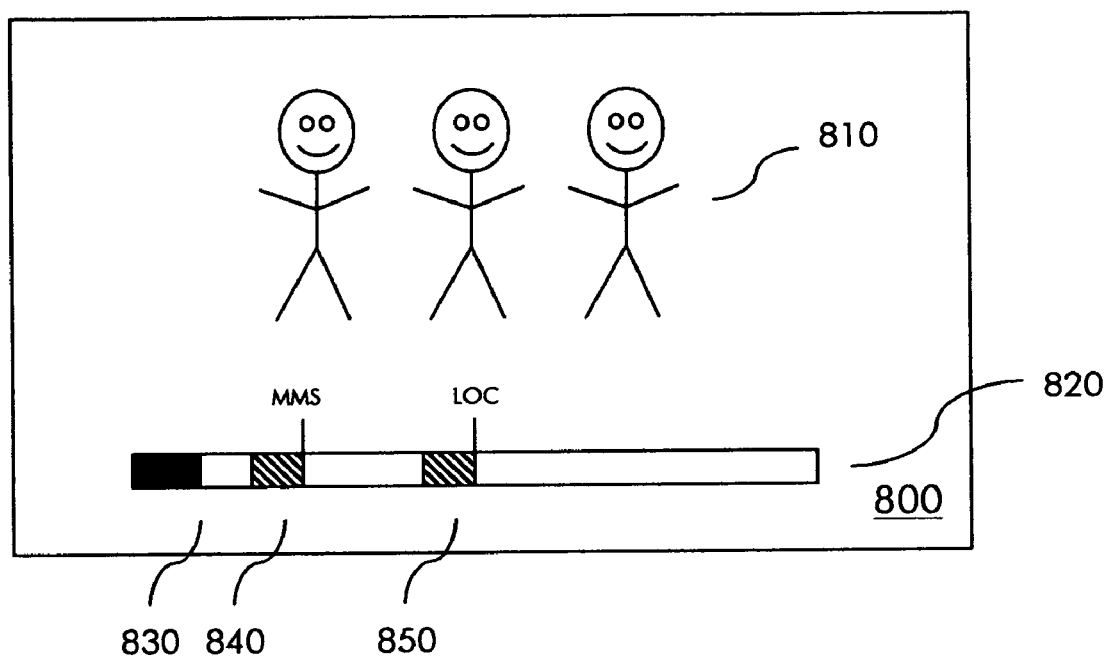
FIG. 8 shows a second exemplary screen on a display of a wireless communication device.

Turning now to FIG. 8, a second exemplary screen 410 on a display 400 of user interface 140 is shown. Screen 810 is rendered substantially contemporaneously with the capture of a video sequence by video capture system 130, that is to say, in near real-time. Screen 810 renders the near real-time video sequence while rendering simultaneously near real-time information on conformance of the video sequence with target uses for the video sequence.

In the example shown, conformance information is shown for two target uses. The first target use is remote playback of the video sequence after offload via wireless interface 160 in an MMS message. The second is local playback of the video sequence from local memory 120. The conformance information includes a progress bar 820 having a current length indicator 830 showing the current length of the video sequence relative to an MMS limit marker and an LOC limit marker, which are associated with limit lengths for the remote playback target use and the local playback target use, respectively. The limit markers MMS, LOC are associated with time windows 840, 850, respectively. Time windows 840, 850 represent time intervals during which, if a user depresses and releases a STOP key, video capture will not terminate immediately but rather will continue until the associated TULL is reached. The function of time windows 840, 850 will be further explained by reference to FIG. 9, which is now discussed.

Figure 9:
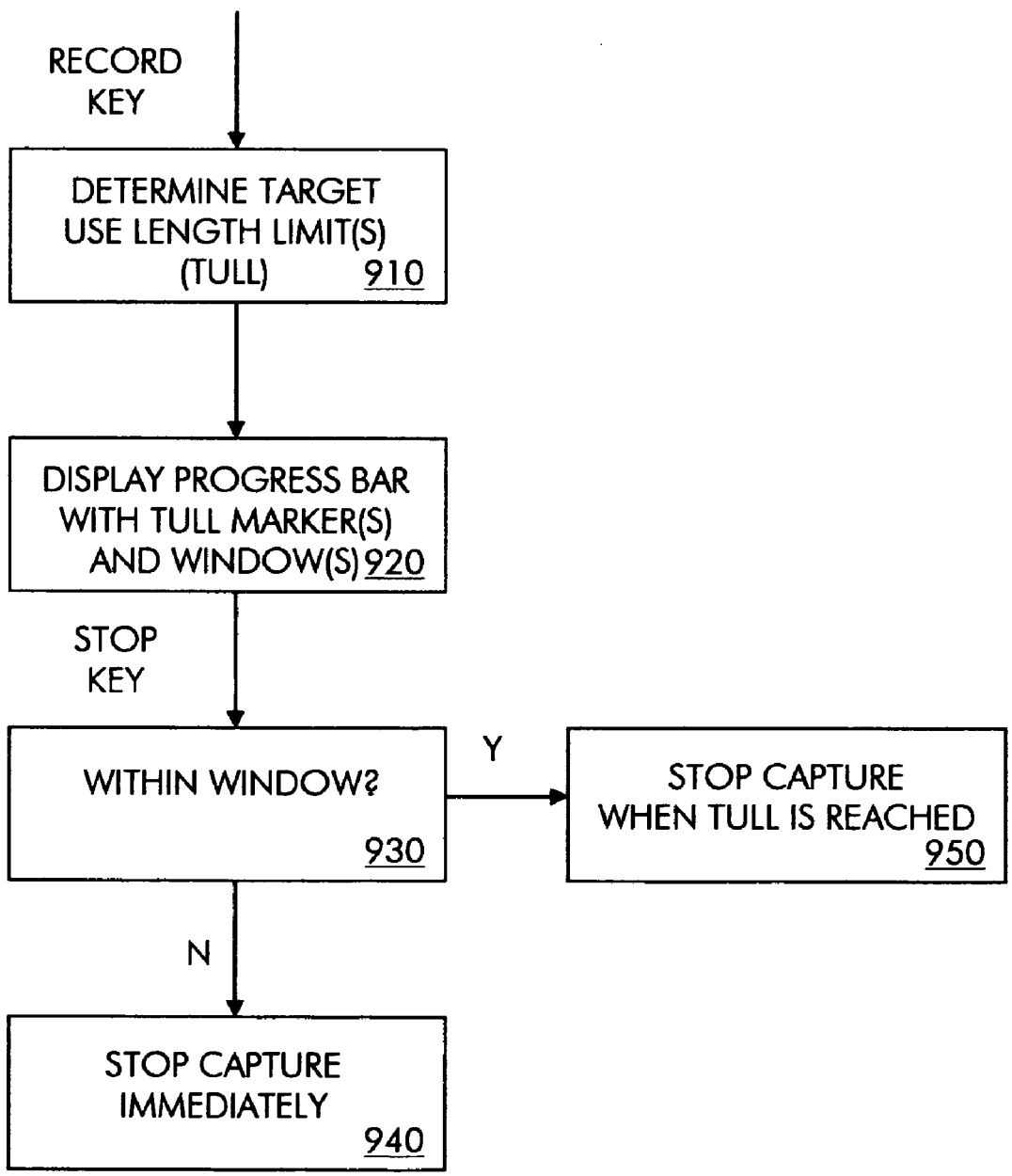
FIG. 9 is a flow diagram of a fourth target use video limit enforcement method performed by a wireless communication device.

In FIG. 9, a flow diagram of a fourth target use video limit enforcement method performed by device 100 is shown. The flow begins with device 100 awaiting the start of capture of a video sequence. The start of capture is initiated by a user who depresses and releases a RECORD key on a keypad of user interface 140. Once the video sequence begins to be captured, device 100 determines operative TULL for video sequences (910) through consultation of progress bar settings 230. Once the operative TULL have been determined, device 100 renders on display 800 in near real-time the video sequence being captured while rendering simultaneously a near real-time progress bar having a current length, one or more TULL markers determined from the operative TULL, and one or more windows 840, 850 associated with the operative TULL (920). The flow then proceeds with device 100 awaiting depression and release of a STOP key on the keypad of user interface 140. When the STOP key is depressed and released, device 100 determines if the progress of the video sequence (represented by the current length of the progress bar) is within one of the time intervals during which, if the user depresses and releases a STOP key, video capture will not terminate immediately but rather will continue until the associated TULL is reached (represented by time windows 840, 850) (930). If the current length is not within one of time windows 840, 850 when the STOP key is depressed and released, device 100 stops video capture immediately (940). If the current length is within one of time windows 840, 850 when the STOP key is depressed and released, device 100 stops video capture when the associated TULL is reached (950).

The steps performed in the methods of FIGS. 5-7 and 9 are performed or facilitated by video recorder/player 220 running on processor 110 and interfacing with video capture system 130, user interface 140 and progress bar settings 230.

The RECORD, STOP and STOP AT TULL X keys invoked in the methods of FIGS. 5-7 and 9 may be, for example, hard keys, soft keys or menu selection keys depressed/released when the subject functions are the current selection on a menu. In some embodiments, RECORD, STOP and STOP AT TULL X keys may be buttons, levers or switches that are not associated with any keypad. In the case of levers and switches, depression/release sequences may be replaced with sequences in which the levers or switches are toggled between positions.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method for target use video limit enforcement on a wireless communication device, comprising the steps of:
   determining a limit length of a target use by the wireless communication device;
   capturing a video sequence by the wireless communication device; and
   terminating capture of the video sequence by the wireless communication device upon reaching a limit length of a target use for the video sequence in response to an input commenced on a user interface of the wireless communication device prior to reaching the limit length indicative of a decision to terminate capture of the video sequence at the limit length, wherein the input comprises depressing a stop at limit length key on the user interface before the limit length is reached.

2. A method for target use video limit enforcement on a wireless communication device, comprising the steps of:
   determining a limit length of a target use by the wireless communication device;
   capturing a video sequence by the wireless communication device; and
   terminating capture of the video sequence by the wireless communication device upon reaching a limit length of a target use for the video sequence in response to an input commenced on a user interface of the wireless communication device prior to reaching the limit length indicative of a decision to terminate capture of the video sequence at the limit length, wherein the input comprises depressing a stop key on the user interface before the limit length is reached and holding the stop key in a depressed position until the limit length is reached.

3. A method for target use video limit enforcement on a wireless communication device, comprising the steps of:
   determining a limit length of a target use by the wireless communication device;
   capturing a video sequence by the wireless communication device; and
   terminating capture of the video sequence by the wireless communication device upon reaching a limit length of a target use for the video sequence in response to an input commenced on a user interface of the wireless communication device prior to reaching the limit length indicative of a decision to terminate capture of the video sequence at the limit length, wherein the input comprises depressing a record key on the user interface and holding the record key in a depressed position for a predetermined time.

4. A method for target use video limit enforcement on a wireless communication device, comprising the steps of:
   determining a limit length of a target use by the wireless communication device;
   capturing a video sequence by the wireless communication device; and terminating capture of the video sequence by the wireless communication device upon reaching a limit length of a target use for the video sequence in response to an input commenced on a user interface of the wireless communication device prior to reaching the limit length indicative of a decision to terminate capture of the video sequence at the limit length, wherein the input comprises depressing a stop key on the user interface within a predetermined time window before the limit length is reached.

5. The method of claim 4, wherein the lime window is rendered on the user interface.

6. A method for target use video limit enforcement on a wireless communication device, comprising the steps of:
 determining a limit length of a target use by the wireless communication device;
 capturing a video sequence by the wireless communication device;
 receiving on a user interface of the wireless communication device an input indicative of an advance decision to terminate capture of the video sequence at a limit length of a target use for the video sequence; and
 terminating capture of the video sequence by the wireless communication device upon reaching the limit length, wherein the input comprises depressing a stop at limit length key on the user interface before the limit length is reached.

7. A method for target use video limit enforcement on a wireless communication device, comprising the steps of:
 determining a limit length of a target use by the wireless communication device;
 capturing a video sequence by the wireless communication device;
 receiving on a user interface of the wireless communication device an input indicative of an advance decision to terminate capture of the video sequence at a limit length of a target use for the video sequence; and
 terminating capture of the video sequence by the wireless communication device upon reaching the limit length, wherein the input comprises depressing a stop key on the user interface before the limit length is reached and holding the stop key in a depressed position until the limit length is reached.

8. A method for target use video limit enforcement on a wireless communication device, comprising the steps of:
 determining a limit length of a target use by the wireless communication device;
 capturing a video sequence by the wireless communication device;
 receiving on a user interface of the wireless communication device an input indicative of an advance decision to terminate capture of the video sequence at a limit length of a target use for the video sequence; and
 terminating capture of the video sequence by the wireless communication device upon reaching the limit length, wherein the input comprises depressing a record key on the user interface and holding the record key in a depressed position for a predetermined time.

9. A method for target use video limit enforcement on a wireless communication device, comprising the steps of:
 determining a limit length of a target use by the wireless communication device;
 capturing a video sequence by the wireless communication device;
 receiving on a user interface of the wireless communication device an input indicative of on advance decision to terminate capture of the video sequence at a limit length of a target use for the video sequence; and
 terminating capture of the video sequence by the wireless communication device upon reaching the limit length, wherein the input comprises depressing a stop key on the user interface within a predetermined time window before the limit length is reached.

\* \* \* \* \*

UNITED STATES PATENT AND TRADEMARK OFFICE
CERTIFICATE OF CORRECTION

PATENT NO. : 7,656,438 B2 Page 1 of 1
APPLICATION NO. : 11/649648
DATED : February 2, 2010
INVENTOR(S) : Atsushi Ishii et al.

It is certified that error appears in the above-identified patent and that said Letters Patent is hereby corrected as shown below:

In Claim 5, Column 9, Line 11, "lime" is replaced with --time--.

Signed and Sealed this

Sixth Day of April, 2010

David J. Kappos
*Director of the United States Patent and Trademark Office*